F. O. DENNIS.
PHOTOGRAPHIC PRINTING DEVICE.
APPLICATION FILED DEC. 1, 1911.
1,085,892.
Patented Feb. 3, 1914.
3 SHEETS—SHEET 1.
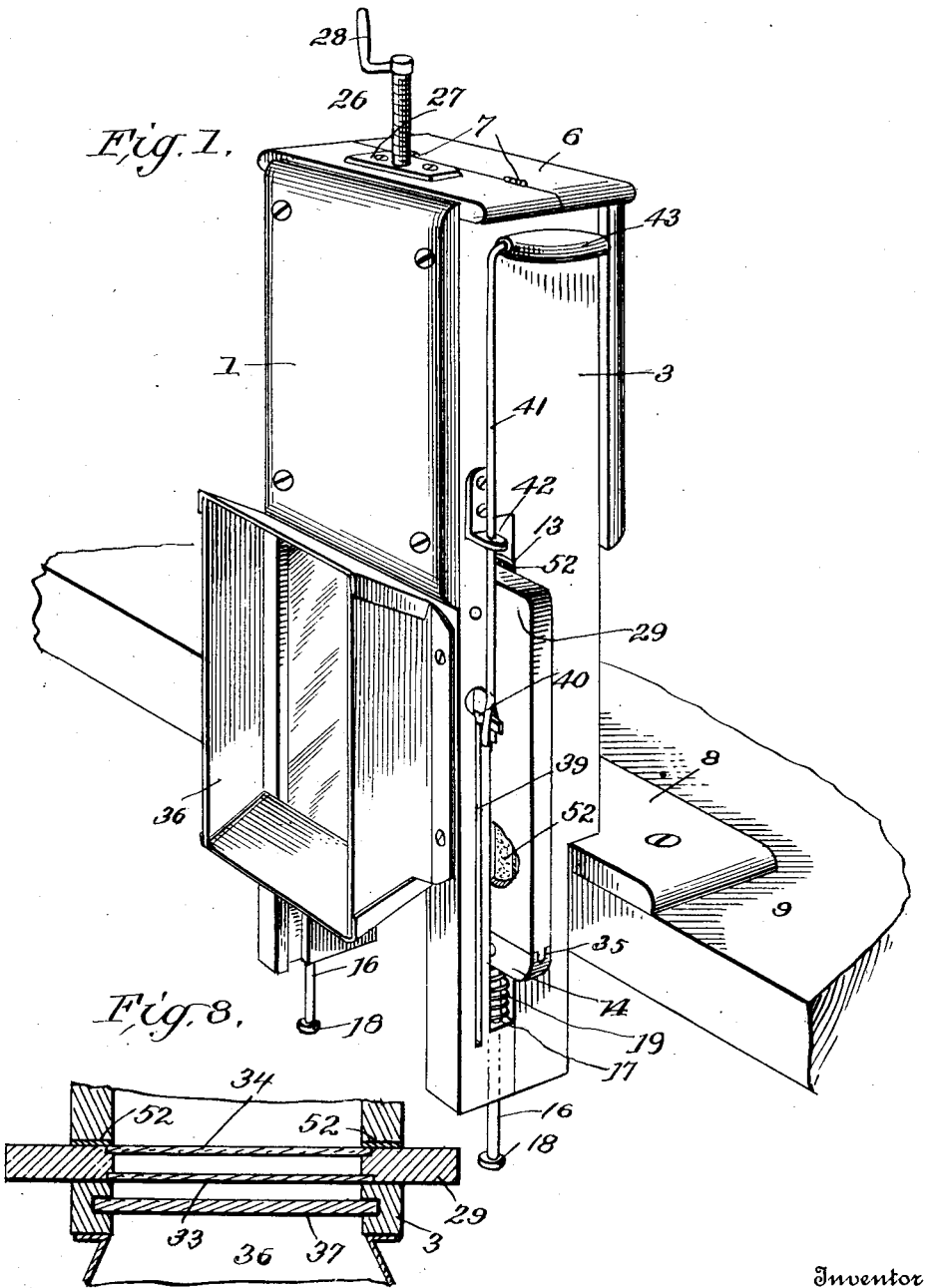

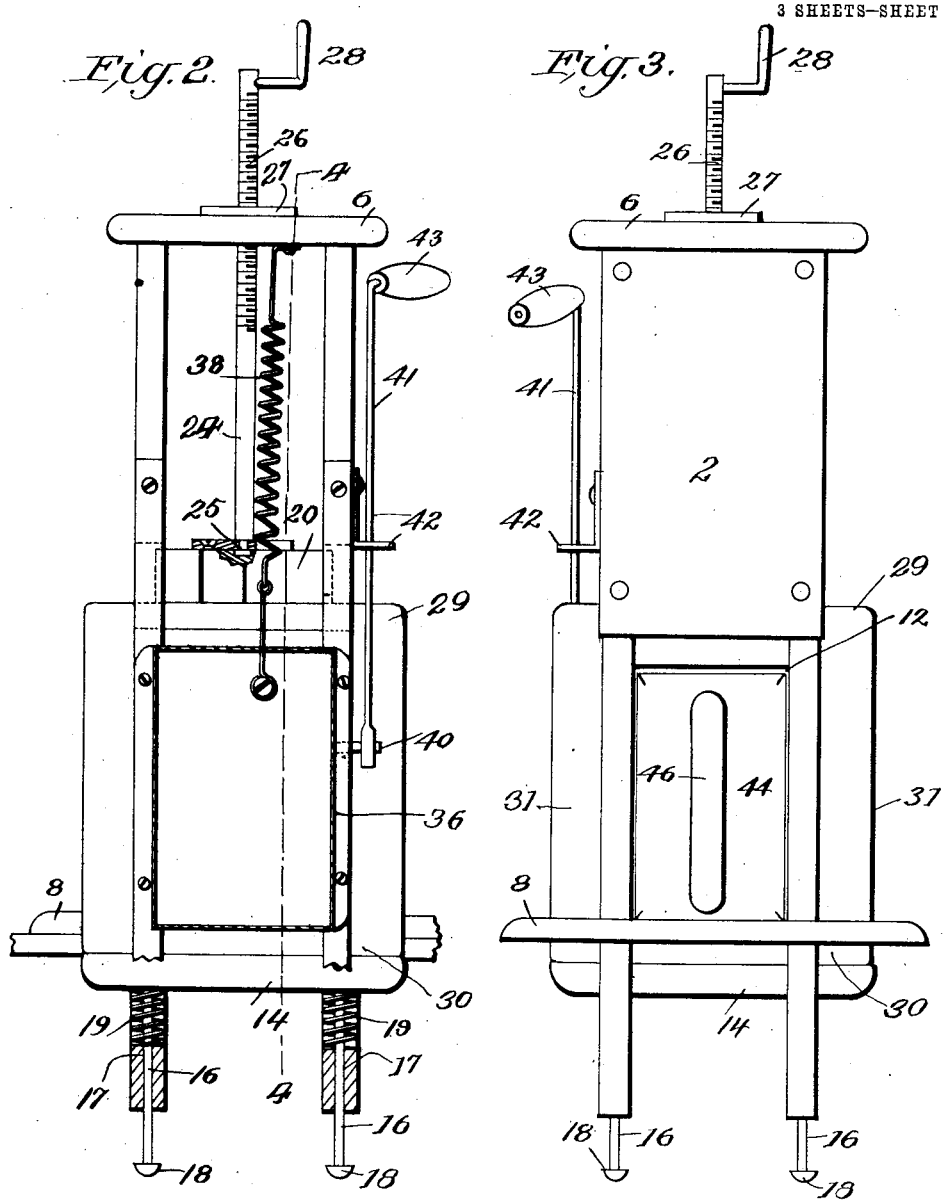

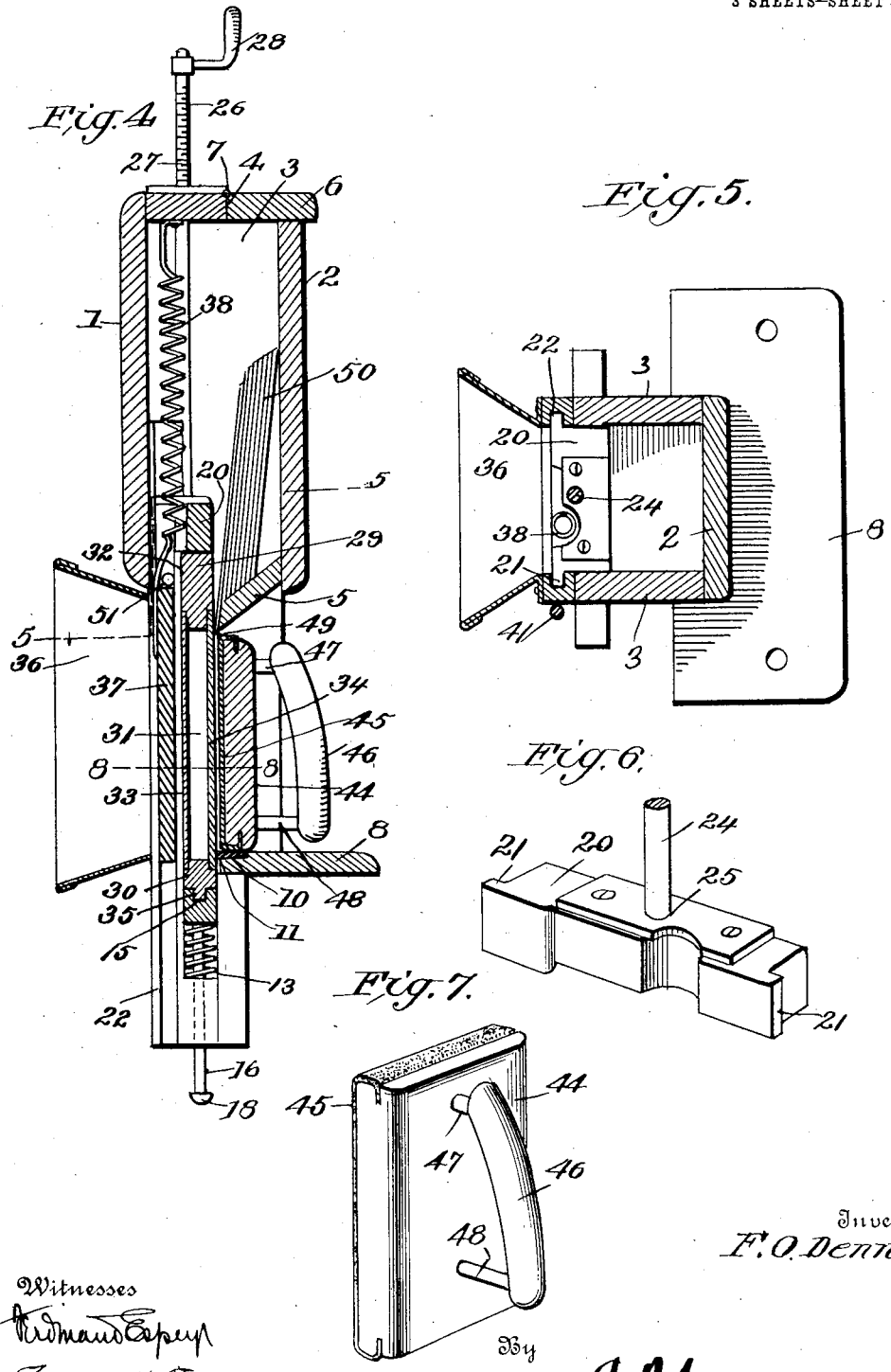

UNITED STATES PATENT OFFICE.

FRANK OLIVER DENNIS, OF NORTH CLARENDON, VERMONT, ASSIGNOR OF ONE-HALF TO AUGUST NELSON, OF NORTH CLARENDON, VERMONT.

PHOTOGRAPHIC-PRINTING DEVICE.

1,085,892.      Specification of Letters Patent.      Patented Feb. 3, 1914.

Application filed December 1, 1911. Serial No. 663,284.

*To all whom it may concern:*

Be it known that I, FRANK OLIVER DENNIS, citizen of the United States, residing at North Clarendon, in the county of Rutland and State of Vermont, have invented certain new and useful Improvements in Photographic-Printing Devices, of which the following is a specification.

This invention relates to photographic printing apparatus, and aims to provide an apparatus by the use of which photographic prints may be more expeditiously made than by the ordinary methods and proofs or prints of even contrast throughout secured from negatives of uneven contrast.

By the ordinary method of photographic printing, where prints are to be made from a negative which is of uneven contrast, or is "flat" in part, it is customary to shade the contrasty portion of the negative during the printing operation so that the "flat" portion thereof will be exposed for a greater length of time with the result that the proof or print is of even contrast throughout. The disadvantage of such a method of procedure, however, lies in the fact that expert manipulation of the shading card employed is necessary in order to produce a number of prints from the same negative, all of which prints will be of even contrast throughout, and of the same density. The apparatus of the present invention is designed to afford means whereby a number of prints may be rapidly made from a negative of uneven contrast, and will be identical in contrast and in density.

A further object of the invention is to provide, in an apparatus of the class mentioned, means for adjusting the holder for the negative with relation to that portion of the apparatus in which the sensitized paper or card is positioned so that any number of prints (smaller than the negative) can be made by exposing only the best portion of the negative during the printing operation. This is difficult of accomplishment where the ordinary method of printing is followed, for the reason that the sensitized paper or card must be accurately adjusted in the printing frame in order that all of the prints will appear alike and the ordinary printing frame embodies no means for indicating to the operator when the proper adjustment of the sensitized paper with respect to the negative has been made.

A further object of the invention is to so construct the apparatus that a number of prints may be successively made from the same negative without danger of the sensitized paper or cards upon which the prints are made, being light struck.

For a full understanding of the invention reference is to be had to the following description and accompanying drawing, in which:—

Figure 1 is a perspective view of the apparatus set up for use. Fig. 2 is a front elevation thereof, parts being shown in section. Fig. 3 is a rear elevation. Fig. 4 is a vertical sectional view therethrough taken in a plane from front to rear on the line 4—4 of Fig. 2. Fig. 5 is a horizontal sectional view on the line 5—5 of Fig. 4. Fig. 6 is a detail perspective view of one of the heads between which the negative holder is positioned. Fig. 7 is a perspective view illustrating the backing device employed for holding the sensitized paper or card against the negative during the printing operation. Fig. 8 is a horizontal sectional view on the line 8—8 of Fig. 4.

Corresponding and like parts are referred to in the following description and indicated in all the views of the drawings by the same reference characters.

In the drawings, the apparatus is illustrated as embodying a magazine in which the sensitized cards or sheets are contained and from which they are successively fed into position against the negative from which the prints are to be made and this magazine embodies a front wall 1, a rear wall 2, side-walls 3, a top 4, and an inclined bottom 5. The top 4 of the magazine is preferably formed of a front fixed section and a rear hinged section 6, the hinges connecting the two sections being indicated by the numeral 7. The section 6 may be readily swung up so as to permit of the introduction of the sensitized cards or sheets into the magazine, and when introduced they will assume about the position shown in Fig. 4 of the drawings, that is with their lower edges resting upon the inclined bottom 5 of the said magazine.

It will be observed that the side-walls 3 extend downwardly a considerable distance below the front, rear and bottom walls of the magazine and that near their lower ends they are secured to an attaching base 8 which is designed to be fixed to a table or like support indicated in Fig. 1 by the numeral 9.

By referring to Fig. 4 of the drawings it will be observed that the intermediate portion of the attaching base 8 projects forwardly between the extended portions of the sides 3 and is rabbeted in its upper side as at 10 and has fixed in its rabbet a strip 11 of rubber or other material, the forward edge portion of which projects beyond the forward edge of the extended portion of the attaching base and is designed to perform a function to be presently explained. The forward edge of the inclined bottom 5 of the magazine, the projecting edge of the strip 11, and the portions of the sides 3 between the bottom 5 and the attaching base 8, define a rectangular opening 12 in which the sensitized card or sheet is to be positioned during the printing operation.

The apparatus embodies means for supporting the negative holder thereof in advance of the opening above referred to, in which the sensitized card or sheet is positioned during the printing operation, and this means will now be described. Each side 3 is formed with a vertically extending slot 13 and these slots are transversely alined and terminate at their upper ends at points immediately above the bottom of the magazine and at their lower ends adjacent the lower ends of the extended portions of the said sides. The negative holder to be presently fully described, is held between two heads and one of these heads is indicated by the numeral 14, and, for a purpose to be presently explained, is formed in its upper side with a longitudinally extending groove 15. Rods 16 are fixed at their upper ends in the head 14 near each end thereof and project downwardly at right angles from the head and slidably through openings 17 formed in the lower ends of the extended portions of the sides 3. These rods are preferably provided at their lower extremities with heads 18 which, by abutting against the said lower ends of the said portions of the sides, serve to limit the upward movement of the rods through the openings 17. A spring 19 is fitted upon each rod 16 and bears at its upper end against the under side of the head 14 and at its lower end against the bottom wall of the slot 13 into which the rod projects, and these springs serve to force the head 14 upwardly in the said slots. The other head mentioned above is indicated by the numeral 20 and is formed at its ends with tongues 21 which fit slidably in grooves 22 formed in the opposing faces of the sides 3. An adjusting screw-rod 24 is swiveled at one end as at 25 to the upper side of the head 20 and is threaded throughout the greater portion of its length as indicated at 26. This rod has threaded engagement through a plate 27 secured upon the fixed section of the top of the magazine, and is provided at its end opposite its end which is connected to the head 20, with a crank-handle 28 by means of which it may be rotated so as to elevate or lower the head 20. The head 20 is located directly above the head 14 as will be observed from inspection of Fig. 4 of the drawings. The negative holder of the apparatus is in the nature of a frame having upper and lower sides 29 and 30 and ends 31, the said sides and ends of the frame as a whole, being rabbeted as at 32 to form sockets. In the socket in one side of the negative holder there is fitted a ground-glass 33 and in the socket at the other side of the said holder is fitted the negative from which the prints are to be made, this negative being indicated by the numeral 34. The side 30 of the negative holding frame is formed upon its under side with a tongue 35 which fits slidably in the groove 15 in the head 14 and the head 20 bears against the side 29 of the said frame, when the frame is in place between the two heads.

In arranging the frame between the heads 14 and 20, it is slid into place, the head 20 having been first sufficiently elevated to permit ready introduction of the frame; which is adjusted by sliding it laterally in one direction or the other so as to bring that portion of the negative from which it is desired to print, into position in advance of the opening 12 in which the sensitized card or sheet is to be positioned. The adjusting screw-rod 24 is then rotated by means of the handle 28 so as to cause the head 20 to bear firmly against the upper side of the negative holding frame and by rotating the said adjusting screw a greater or less number of times, the said negative holder may be vertically adjusted in front of the opening 12. The springs 19 bearing against the head 14, serve to cause this head to frictionally bind the negative holder so as to prevent its accidental disarrangement after having been properly adjusted. It may be remarked at this point that the projecting forward edge of the strip 11 bears against the negative 34 as illustrated in Fig. 4 of the drawings, and that the forward edge of the bottom wall of the magazine is slightly spaced from the said negative, preferably only to such degree as to permit of the feeding of a sensitized card or sheet from the said magazine between the said edge of the inclined bottom and the said negative. A hood of substantially frusto-pyramidal form, indicated by the numeral 36, is secured to the forward edges of the extended portions of the sides 3 and the attached or minor end of this hood is substantially of the same dimensions as the opening 12. The function of this hood will be presently made clear. A shutter 37 is slidably mounted in the grooves 22 and is normally held by means of a spring 38, attached to it and to the under side of the fixed section of the top of the magazine in position to close the said minor end of the hood and to cover the ground-glass 33 in the negative holder, and projecting laterally from one edge of this shutter and through a slot 39 formed in one of the sides 3, is a stud 40 to which is connected the lower end of a slide-rod 41 which works through a bracket 42 attached to the said side 3. This rod is provided at its upper end with a laterally projecting handle 43 which may be grasped for the purpose of sliding the rod in a downward direction through the said bracket 42. Such movement of the rod, as will be readily understood, will serve to lower the shutter 37 against the tension of the spring 38 and it will be further understood that the rod may be manipulated so as to uncover a greater or less area of the ground-glass-plate 33.

In Fig. 7 of the drawings, there is shown a backing device which is designed to be held by one hand against the sensitized card or sheet positioned within the opening 12 so that the said card or sheet will be held flat against the negative during the printing operation, and this backing device includes a flat body 44 having one face covered with a sheet 45 of felt or like material, and a handle which includes a grip portion 46 and shanks 47 and 48 which connect the upper and lower ends, respectively, of the grip portion to the body 44. It will be observed that the shank 47 is of less length than the shank 48, so that the grip portion 46 will be so angularly positioned with respect to the body 44 that it may be readily grasped.

The manner of using the apparatus is as follows:—The adjusting screw 24 is first rotated so as to elevate the head 20 and the ground-glass 33 and negative 34 are then assembled in the negative holder 29 in the manner heretofore described, and illustrated in Fig. 4 of the drawings. The holder is then slid into place through one of the slots 13 and into position between the heads 14 and 20. It is then adjusted laterally so as to bring into position, in front of the opening 12, the portion of the negative from which it is desired to print. The adjusting screw 24 is then turned so as to lower the head 20 and thereby lower the negative holder so as to secure further adjustment of the negative with respect to the opening 12 and also to cause the said holder to be gripped between the said heads, sufficiently firmly to prevent its accidental disarrangement. During the adjustment of the holder, the shutter 37 may be repeatedly lowered so as to view the negative through the opening 12. Before or after this adjustment has been secured, the apparatus is arranged within a darkened room with the forward or major end of its hood 36 registering with an opening cut in a window shade or shutter at one window of the room, and the magazine of the apparatus is supplied with a desired number of sensitized cards or sheets upon which the prints are to be made. The foremost one of the cards or sheets disposed within the magazine will drop through the space between the forward edge of the bottom wall of the magazine and the negative 34 and into position in the opening 12 with its sensitized side against the negative. The backing device shown in Fig. 7 is then disposed against the said card or sheet in the manner illustrated in Fig. 4, the sheet being indicated in this figure by the numeral 49 and the cards or sheets to be subsequently exposed being indicated by the numeral 50. With the sheet or card held firmly against the negative, the shutter is lowered by gripping the handle 43 and shoving down upon the rod 41 and, the required exposure having been made, the handle is released and the shutter is quickly and automatically returned by the spring 48 to normal position, it being limited in its upward movement by stops 51 positioned within the grooves 22. The backing device is then removed, as is also the exposed sheet and upon removal of the exposed sheet, the foremost one of the several sheets 50 will drop into place in the opening 12. It will be readily understood that not only does the projecting forward edge of the strip 11 serve as a means for supporting the card or sheet being exposed, but it also serves as a means preventing the sheet becoming light struck at its lower edge, should the room in which the apparatus is arranged, not be materially darkened. Also, as a means for preventing the sensitized cards becoming light struck at their edges, the rear wall of each slot 13 is faced with a rubber or similar strip indicated by the numeral 52, (Fig. 8).

It will be understood from the foregoing that not only may prints be made more rapidly by the apparatus embodying this invention than by the ordinary method of printing, but also that if a negative from which prints are to be made is lacking in contrast for a portion of its area, the negative holder may be so adjusted as to locate this portion uppermost, and during the first portion of the exposure, the shutter may be lowered only sufficiently far to expose this "flat" portion of the negative and for the remainder of the exposure may be completely lowered so as to expose the entire portion of the negative from which prints are to be made.

Having thus described the invention what is claimed as new is:—

1. In photographic printing apparatus, a support having an opening for the reception of a sensitized sheet, a negative holder adjustably mounted in front of the opening, a shutter mounted for vertical movement in front of the holder, a spring normally holding the shutter elevated, and means whereby the shutter may be depressed to expose a negative held by the holder.

2. In photographic printing apparatus, a support having an opening for the reception of a sensitized sheet, a negative holder mounted in front of the opening, a shutter mounted in front of the negative holder, a spring normally holding the shutter closed, and a manually operable slide-rod connected with the shutter and operable to move the shutter to part or full open position.

3. In photographic printing apparatus, a support having an opening for the reception of a sensitized sheet, a head mounted in advance of and below the opening, means yieldably supporting the head in elevated position, a head mounted for vertical adjustment in advance of and above the opening, means for adjusting the last mentioned head, and a negative holder removably fitted between the heads.

4. In photographic printing apparatus, a support having an opening for the reception of a sensitized sheet, a head mounted in advance of and below the opening, means yieldably supporting the head in elevated position, a head mounted for vertical adjustment in advance of and above the opening, means for adjusting the last mentioned head, and a negative holder removably fitted between the heads and laterally adjustable with respect thereto.

5. In photographic printing apparatus, a support having an opening for the reception of a sensitized sheet, a head mounted in advance of the opening, a spring yieldably supporting the head in elevated position, a head mounted for vertical adjustment above the first mentioned head, means for positively adjusting the last mentioned head, and a negative holder fitted and held between the heads and vertically adjustable through the adjustment of the last mentioned head against the tension of the spring supporting the first mentioned head.

6. In photographic printing apparatus, a support having an opening for the reception of a sensitized sheet, an adjustable head arranged in advance of and above the opening, a second head arranged below the first mentioned head, a spring holding the second mentioned head in the direction of the first mentioned head, a negative holder frictionally gripped between the heads and laterally adjustable with respect thereto therebetween, and a shutter mounted in front of the holder.

7. In photographic printing apparatus, a support having an opening for the reception of a sensitized sheet, an adjustable head arranged in advance of and above the opening, a second head arranged below the first mentioned head, a spring holding the second mentioned head in the direction of the first mentioned head, a negative holder frictionally gripped between the heads and laterally adjustable with respect thereto therebetween, and a shutter mounted in front of the holder and adjustable to expose a greater or less portion of a negative mounted in the holder.

8. In photographic printing apparatus, a magazine, said magazine including a bottom and side-walls, a negative holder mounted for adjustment between the side-walls, the bottom wall of the magazine being slightly spaced from the said holder, a supporting element below the said bottom wall of the magazine and extending across the said holder, the said supporting element serving as a support for a sensitized sheet fed through the space between the bottom wall of the magazine and the said holder, and a shutter mounted in front of the holder.

In testimony whereof I affix my signature in presence of two witnesses.

FRANK OLIVER DENNIS. [L. S.]

Witnesses:
  M. GRACE MURPHY,
  SARA E. RYAN.

---

Copies of this patent may be obtained for five cents each, by addressing the "Commissioner of Patents, Washington, D. C."